US 6,484,023 B1

(12) United States Patent
Chen

(10) Patent No.: US 6,484,023 B1
(45) Date of Patent: Nov. 19, 2002

(54) APPARATUS OF A WIRELESS ELECTRONIC ACCOUNT BOOK

(75) Inventor: Hu-Mu Chen, San Chung (TW)

(73) Assignee: Taiwan Paging Network Inc., Taipei (TW)

( * ) Notice: Subject to any disclaimer, the term of this patent is extended or adjusted under 35 U.S.C. 154(b) by 0 days.

(21) Appl. No.: 09/460,691

(22) Filed: Dec. 14, 1999

(30) Foreign Application Priority Data

Jul. 9, 1999 (TW) .......................................... 88111735

(51) Int. Cl.$^7$ ............................................. H04M 11/10
(52) U.S. Cl. ........................ 455/412; 455/414; 455/517; 340/825.26; 340/825.27; 340/7.48; 340/7.52; 340/5.41
(58) Field of Search ................................ 455/412, 517, 455/414; 340/825.26, 825.27, 7.48, 7.52, 5.4, 5.41, 5.42; 705/10

(56) References Cited

U.S. PATENT DOCUMENTS

| | | | |
|---|---|---|---|
| 5,987,100 A | * 11/1999 | Fortman et al. | 379/88.14 |
| 6,178,322 B1 | * 1/2001 | Creech | 455/412 |
| 6,185,436 B1 | * 2/2001 | Vu | 455/558 |
| 6,246,871 B1 | * 6/2001 | Ala-Laurita | 455/413 |

* cited by examiner

Primary Examiner—Edward F. Urban
Assistant Examiner—Marceau Milord
(74) Attorney, Agent, or Firm—Powell Goldstein Frazer & Murphy LLP

(57) ABSTRACT

An apparatus and a control system to communicate with a portable wireless communication device to act as an electronic account book. The system comprises: an information providing dealer to provide a personal bank savings; an information transmission dealer to define the mailbox of a wireless receiving device and to transmit service information from the information providing dealer; a wireless receiving device, such as an electronic account book, to receive formatted information from different information providing dealers, and for checking the authority by its own machine code. When the user of the wireless receiving device asks for a function service, the information providing dealer will communicate with the information transmission dealer and store the related data of the wireless receiving device. After the information transmission dealer defines a mailbox of the wireless receiving device, the information providing dealer can start to deliver the service information to a specific wireless receiving device via the information transmission dealer.

20 Claims, 4 Drawing Sheets

APPARATUS OF A WIRELESS ELECTRONIC ACCOUNT BOOK

FIELD OF THE INVENTION

The present invention relates to a wireless communication control system, and more particularly to an apparatus and a control system to communicate with a portable wireless communication device such as an electronic account book.

BACKGROUND OF THE INVENTION

Recently, the telecommunication business has developed quickly. The system manufacturer and the spectrum of applications such as Personal Digital Assistants (PDA), cellular telephones, pagers, handheld computers and other similar systems are being exploited to get better efficiency and to develop a more convenient way of communication. Due to the request of real information by modern people, the wide variety of applications and the ability to implement new end-user services is vital for commercial products.

Various cellular radio or mobile phone systems are presently in use to provide high quality, mobile communications over wide coverage areas. One such system to provide efficient wireless communication of data signals in an integrated package has been accomplished in part by the Cellular Digital Packet Data (CDPD) system or the digital mobile telephone system GSM (Group Special Mobile) of both voice and data signals.

There has long been a recognized need for ubiquitous telecommunications services wherein each customer is assigned a personal service number and is provided with suitable equipment (such as the above mentioned PDAs or pagers), which will permit the customer to have one-way or two-way communication capability (i.e., receive messages, or receive and send messages) regardless of the customer's changing geographical position. Besides, the widespread use of Internet over the past years are already combined with wireless communication to provide various information such as E-mail messages or both pictures and literary compositions to end-user's portable devices.

Nevertheless, not only will the operation of Internet provide wireless communication services to end-users, but also the security service firm, the stock corporation, and information service corporation will provide more competitive, specialized, and diverse services through the use of wireless communication. In order to combine with wireless communication and become more convenient for the end-user, it is the trend of the wireless receiving apparatus to be smaller, lighter, and more power saving, therefore becoming suitable for easy use outdoors.

Furthermore, the financial situation of modern people always relies on the bank to deposit money, to invest money in the stocks or mutual funds, or to process credit cards. However, one should have to go to the bank or security firm by himself or make a phone call to confirm the bank savings, the credit line, or the other similar financial situations. Otherwise the users use magnetic strip cards (such as bank cards or credit cards) to conduct banking transactions, which include cash withdrawals, fund transfers, payments, and deposit transactions based on the users'cards. Nevertheless, the information acquired from these channels are time wasting and not efficient whenever the bank or automatic teller machine (ATM) is not available. These traditional financial activities cannot fulfill people's hopes for acquiring real time financial information. Although the wireless communications described above are developed prosperously, there is still no efficient method to combine the personal financial activities with the wireless communications and make a perfect integration.

SUMMARY OF THE INVENTION

The present invention focuses on the benefit of wireless communication devices and discloses a wireless electronic account book and a communication system to control this wireless electronic account book. The deposit savings in the bank or the related financial situations can easily and efficiently be transmitted to the user via wireless communications. Moreover, the present invention will define the transmission format and the designation method of the mailbox in order to transmit the right information to the right device and to store the transmitted information. The user can manage different sources of account in a wireless electronic account book.

In the first embodiment of the present invention, the wireless electronic account book and the controlling system comprise: (1) The information providing dealer, including a database to store the users data and a handling module coupled to a communication device; (2) The information transmission dealer, including a mailbox database of the user's data, a data selection system coupled to a communication device, and an emission module to output a signal; (3) The wireless receiving device, including a receiving module to receive the wireless transmission signal, a frequency decreasing and decoding module to lower the frequency of the signal and decode this signal, a controlling module to receive the signal from the frequency decreasing and decoding module, a mailbox classified addressing code comparison module, a memory module, an output module, and a user input interface that are coupled to the controlling module.

When using the wireless electronic account book, the user should ask for a function service of the wireless receiving device by way of the communication device firstly. The identification (ID) code of the wireless receiving device and user should be provided to the information providing dealer for verification. If it is a legal user, the information providing dealer will provide the ID of itself, the ID of the user, a service title (and the correspondence service code and security code) to the information transmission dealer to transmit.

The information transmission dealer will store the data first, then set the corresponding mailbox number and classified addressing code of the service title according to the data stored in the mailbox database. Next, returning the ID code of the wireless receiving device, the service code and classified addressing code are provided to the information providing dealer for storage. Then, the information transmission dealer will transmit a mailbox format with [machine code +mailbox number+classified addressing code+service title+security code] to the wireless receiving device by the emission module to define a mailbox. Afterwards, the machine code of the wireless receiving device, the classified addressing code, and the service information are transmitted to the wireless receiving device. In the wireless receiving device, after the receiving module receives the messages, the frequency decreasing and decoding module lower the frequency and decode the signal, after the management of the controlling module and comparison of the mailbox classified addressing code comparison module, the signal is stored in a specific memory address according to the classified addressing code, then is displayed on the output module.

In the second preferred embodiment of the present invention, the wireless electronic account book and the controlling system comprise: (1) The information transmission dealer, including a mailbox database, a data selection system which is coupled to a communication device, and an emission module to output a signal; (2) The wireless receiving device, including a receiving module to receive the wireless transmission signal, a frequency decreasing and decoding module, a mailbox classified addressing code comparison module, a memory module, an output module, and a user input interface that are coupled to the controlling module.

When using the wireless electronic account book according to this structure, the user should ask for the function service from the information transmission dealer via the communication device, and inform the ID code of the wireless receiving device and user for validation. The information transmission dealer will provide the service title and the corresponding service code and security code after the validity of user is confirmed. Furthermore, define the corresponding mailbox number and classified addressing code of the service title and deliver a mailbox format of: [machine code+mailbox number+classified addressing code+service title+security code] to the wireless receiving device and complete the mailbox definition.

The service information will start to be delivered after at least one of the mailboxes is defined. The information transmission dealer will transmit the machine code, the classified addressing code and the service information to the wireless receiving device, then display information on the output module.

By using the wireless electronic account book, the bank savings, the credit line of credit cards, or other personal financial information can be transmitted to the personal wireless receiving device. Moreover, the user can manage different accounts provided by a variety of information providing dealers in only one wireless receiving device by way of the definition of data format.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The present invention discloses a portable wireless communication device as an electronic account book and a control system to manage such a device. Herein the electronic account book can be any type of wireless receiving devices such as PDAs, portable computers, cellular phones, or pagers, which can have one-way or two-way communication capability. The detailed description of the present invention is as follows:

The first preferred embodiment is described as follows.

Figure 1:
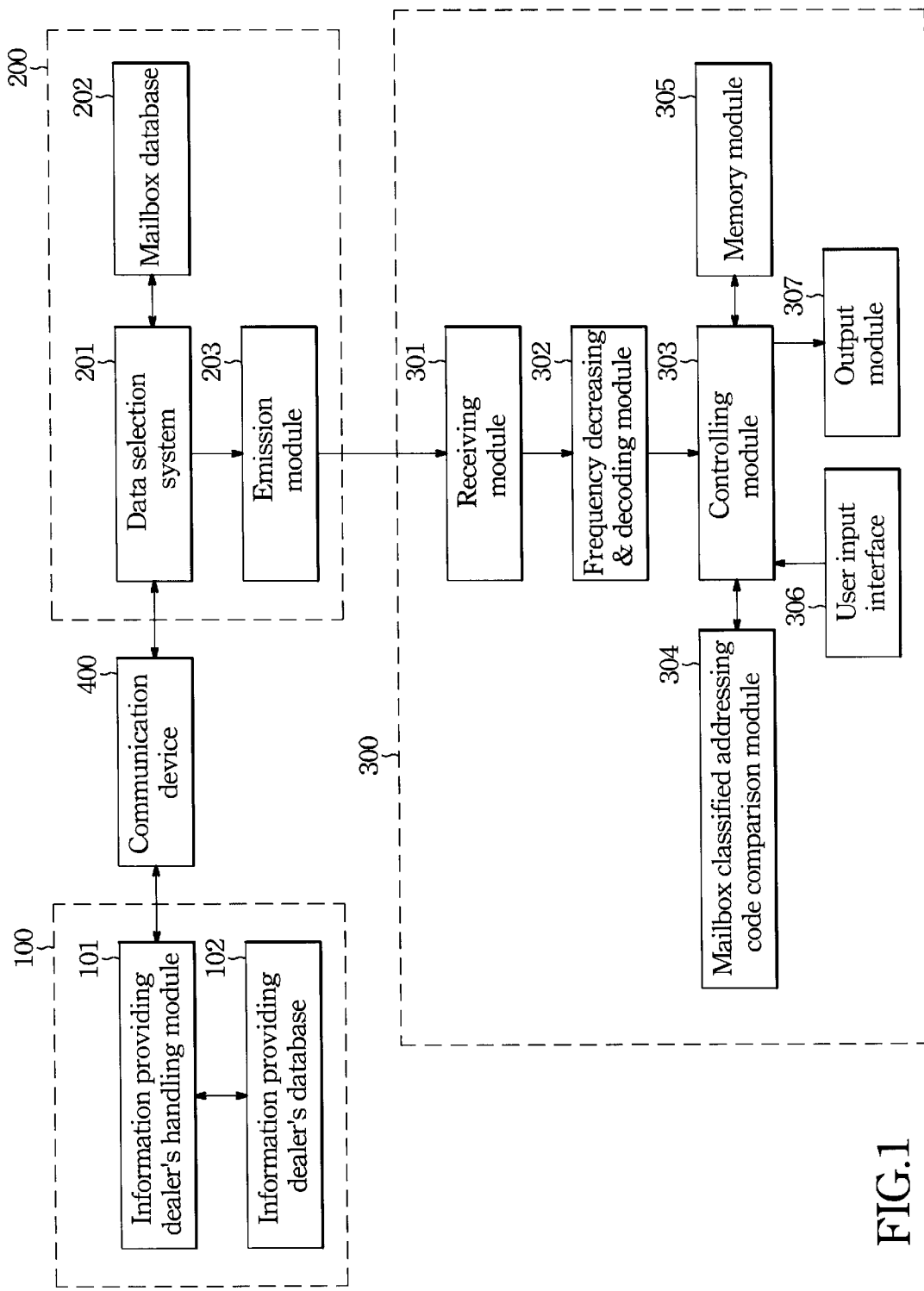
FIG. 1 is a block diagram showing the control system of the wireless electronic account book according to the first preferred embodiment of the present invention.

Referring to FIG. 1, this figure shows the wireless electronic account book and the periphery apparatus according to the first embodiment of the present invention. There are three main blocks in the figure: (1) Information providing dealer 100. The information providing dealer 100 is a banking establishment, a savings and loan association or a securities firm. (2) Information transmission dealer 200. The information transmission dealer 200 is a wireless service provider such as a telecommunication dealer. (3) Wireless receiving device 300. The wireless receiving device 300 is a wireless electronic account book such as previous described a portable PDA, a portable computer, a cellular phone or a pager.

This embodiment further consists of an information providing dealer's handling module 101 and an information providing dealer's database 102 in the information providing dealer 100. The information providing dealer's handling module 101 is coupled to the external communication device 400 such as a regular telephone system or an Internet computer system to receive the messages from the users. The information providing dealer's database 102 includes data of users and is coupled to the information providing dealer's handling module 101. When the user of wireless receiving device 300 is about to use one of the functions of the electronic account book (generally the information providing dealer 100 will provide several functions to the user), he or she has to make a request to the information providing dealer 100 via the communication device 400 by a regular telephone, a wireless communication device or E-mail system. Nevertheless, he or she can also ask the information transmission dealer 200 to transfer the request to the information providing dealer 100 via communication device 400. Then, the information providing dealer 100 will provide a specific function to user's wireless receiving device 300. A the same time, the user provides the identification code of the wireless receiving device 300 (i.e. the representative number) and the users' ID to the information providing dealer 100 for confirming the legality of the user before activating the function.

After the information providing dealer's handling module 101 receives the request from the user, the information providing dealer's handling module 101 will search for the user's data from the information providing dealer's database 102 and make a comparison. The information providing dealer 100 is checking not only the legality of the customer's information, but also his (or her) limits of authority. When the validity of the user is confirmed, the information providing dealer's handling module 101 will find out the service title of this function, and the corresponding service code and security code (in order to encrypt the service information). Thereafter, the identification code of the information providing dealer 100, the identification code of the wireless receiving device 300, the service title, the corresponding service code, and the security code will all transfer to the information transmission dealer 200.

The information transmission dealer 200 of the present invention comprises a data selection system 201, a mailbox database 202, and an emission module 203. The data selection system 201 is coupled to communication device 400 in order to receive the data from information providing dealer 100, and to store the data including the identification code of the wireless receiving device 300, the service title, the corresponding service code, and the security code to the coupled mailbox database 202. Moreover, according to the data transferred from the information providing dealer 100, the data selection system 201 will obtain a machine code (or inherent code), a mailbox number of the service title, and a classified addressing code of the wireless receiving device 300 from the users data of the mailbox database 202.

Firstly, the data selection system 201 will return the identification code of the wireless receiving device 300, the service code, and the classified addressing code back to the information providing dealer 100 to notify the related information of the specific wireless receiving device 300. And the information providing dealer 100 will store the related information of the specific wireless receiving device 300. Besides, the data selection system 201 will devise a specific format of data (herein referred to as a mailbox format) in which the information transmission dealer 200 will transfer it to the emission module 203 for wireless transmission. A detailed mailbox format is described hereinafter for better understanding, the format comprises: [mailbox prefix code+ mailbox number+classified addressing code+service title+ security code].

Next, referring to the wireless receiving device 300 of FIG. 1, the device 300 comprises a receiving module 301, a frequency decreasing and decoding module 302, a controlling module 303, a mailbox classified addressing code comparison module 304, a memory module 305, a user input interface 306 and an output module 307.

After the information transmission dealer 200 transmit the above described mailbox format to the wireless receiving device 300, the mailbox definition of the wireless receiving device 300 is completed. Afterward, the real service information starts to transmit. First, the wireless signal from the emission module 203 is received by the receiving module 301, then the coupled frequency decreasing and decoding module 302 will reduce the wireless signal frequency and decode it. Therefore, the data format of [mailbox prefix code+mailbox number+classified addressing code+service title+security code] is obtained.

In this mailbox format, the mailbox prefix code is a machine code of the wireless receiving device 300, or an inherent code. Different wireless receiving devices have the different machine code that is written in the memory module 305. When the controlling module 303 receives the mailbox format, it will compare the content of the mailbox prefix code with the machine code of itself. If the result is false, then it means that the wireless receiving device 300 is not allowed to read the subsequent information; if the result is true, then this wireless receiving device 300 is the designated device and will proceed the following data management (i.e. mailbox definition).

In this mailbox format, the second column belongs to a mailbox number. This column represents the specific address (or the mailbox address) of mailbox format that is written in the memory module 305 of wireless receiving device 300, therefore different devices have different numbers and depend on the size of the memory. The mailbox number is denoted by figures in general, such as 01~99. Every figure represents the written in object mailbox of the mailbox format. If the wireless receiving device 300 can be divided into 99 mailboxes, then every mailbox can be represented by any one of the figures between 01~99. We can use the FIG. 00 to represent the mailbox format stored in one of the mailbox is trying to revise, then the new mailbox format will exist instead of the old mailbox format.

The third column of the mailbox format is a classified addressing code. This code represents for the representative number stored in one specific mailbox. For example, if one specific mailbox can store data amount of 999, then the number between 001~999 stands for each datum. However, the mailbox classified addressing code comparison module 304 of the wireless receiving device 300 will compare the number of classified addressing code with the data stored in the memory module 305, the information will be stored in the corresponding memory address of this classified addressing code as a result.

Then, the fourth column of the mailbox format is the corresponding service title of the classified addressing code, which is a text message named by the information providing dealer 100 or user. Finally, the last column of the mailbox format belongs to a security code. The code is used to encrypt every byte of the wireless transmitted data before transmission and then transmit to the wireless receiving device 300. For example, every byte of the wireless transmitted data will combine with this security code with an "exclusive or" logic to make an encryption. Then, the data will be restored with an "exclusive or" logic at the receiving terminal. Wherein the logic of "exclusive or" is: If the two input bits have the same signal i.e. with the "1" or "0"), then the output signal will be "0"; however, if the two input bits have different signal, then the output signal will be "1". When the transmitted data is not encrypted, the security code can use a number such as "00".

After the mailbox definition of the wireless receiving device 300 is completed, the information providing dealer 100 will start to deliver the actual service information to the user via information transmission dealer 200. In the wireless receiving device 300, the controlling module 303 will receive the external messages from the coupling frequency decreasing and decoding module 302 and take out the related data from the memory module 305, comparing the classified addressing code of the external data with the inherent data in the mailbox classified addressing code comparison module 304, then will store the external data to the corresponding memory address of such classified addressing code in the memory module 305. Moreover, the controlling module 303 is coupled to the user input interface 306. When the user input the instructions such as "read the message", another coupling output module 307 will show the received messages on the display monitor of this output module 307.

Figure 3:
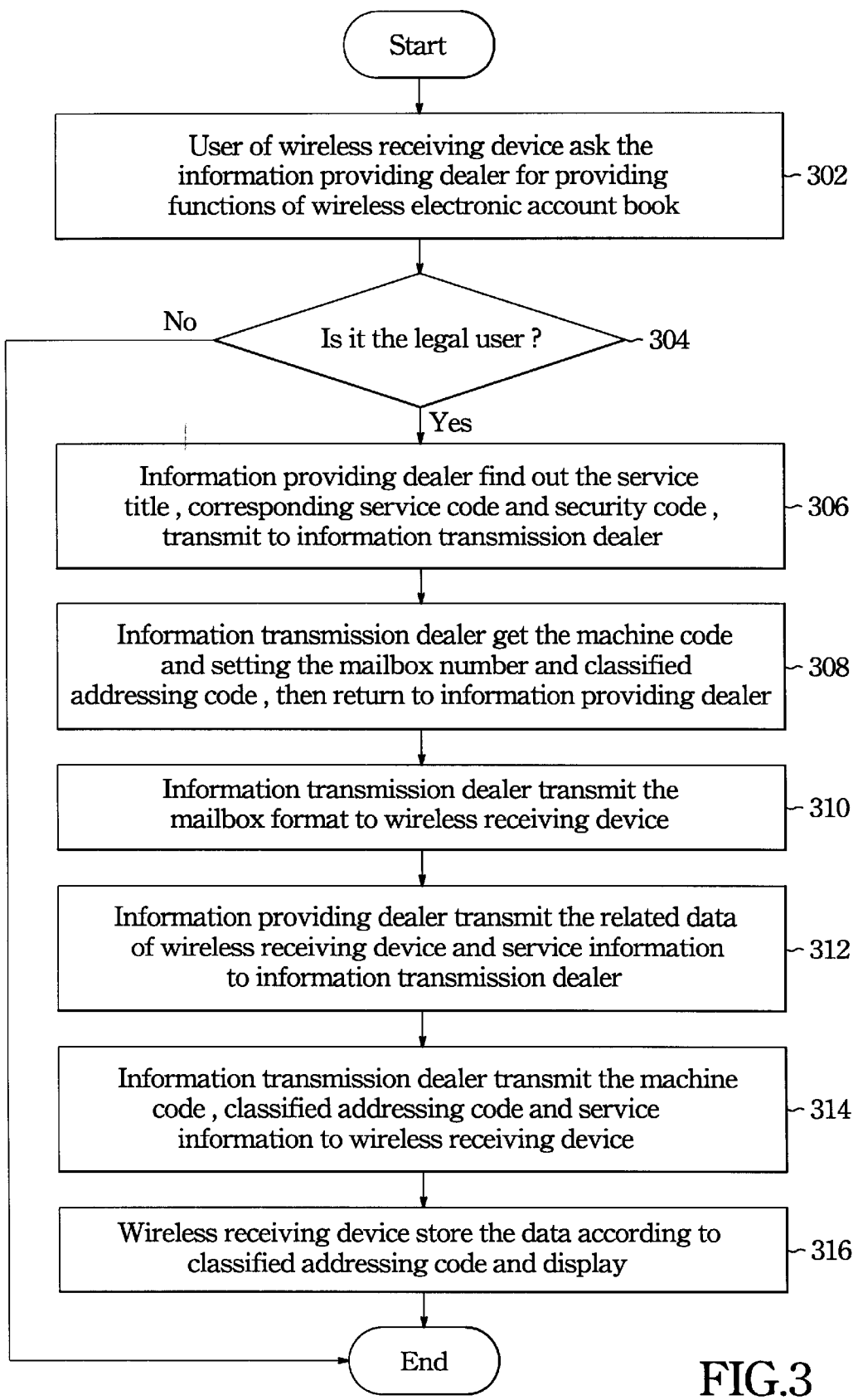
FIG. 3 is a block diagram showing the transmission flow chart of the control system of the wireless electronic account book according to the first preferred embodiment of the present invention.

Referring to FIG. 3, the block diagram of this figure shows the transmission flow chart according to the first embodiment of the present invention. From the beginning of the flow, the user of the wireless receiving device is asking the information providing dealer to provide one of the functions of a wireless electronic account book (i.e., wireless receiving device, step 302). Moreover, the identification code of the wireless receiving device and the user should be provided to the information providing dealer. Then, the information providing dealer should check the legality and the limit of authority of the user (step 304). If it is determined that this is not a legal user, then the flow is ended. Otherwise the information providing dealer will find out the service title and the corresponding service code and security code according to the request of the user, then will transmit the ID code of the information providing dealer and wireless receiving device, the service title, the corresponding service code and security code to the information transmission dealer (step 306).

In step 308, the information transmission dealer will store the abovementioned data transmitted from the information providing dealer, then find out the machine code of the wireless receiving device, setting the mailbox number and classified addressing code of the service title, then will return to the information providing dealer for storage. Next, the information transmission dealer transmits the mailbox format: [mailbox prefix code+mailbox number+classified addressing code+service title+security code] to the wireless receiving device to complete the mailbox definition (step 310). The information providing dealer can start the transmission of actual service information after at least one of the mailboxes is defined in a wireless receiving device.

After the information providing dealer supply the ID code of the wireless receiving device, the classified addressing code and the actual service information to the information transmission dealer (step 312), the information transmission dealer identifies the machine code of the wireless receiving device, then transmits the machine code, the classified addressing code and the actual service information to the wireless receiving device (step 314). Subsequently, the wireless receiving device stores the data in the mailbox according to the classified addressing code and display on the output interface from the request of user. The above-mentioned descriptions complete the transmission flow of wireless electronic account book according to the first embodiment of the present invention.

The flow chart demonstrates that after the information transmission dealer defines the mailbox first, the information providing dealer will keep delivering the actual service information to the personal wireless receiving device via the information transmission dealer. By way of example where bank A uses this method providing the bank savings to a legal user via wireless communications: Firstly, bank A transmits a mailbox format to the wireless receiving device of a legal user to define a mailbox of deposit account, the mailbox format can be: [1234567+15+004+deposit account of bank A+17], wherein:

"1234567" is the mailbox prefix code. This code represents the machine code (or inherent code) of the wireless receiving device to identify different devices;

"15" is the representative number of mailbox. The wireless receiving device will write in the mailbox format into a specific address (or mailbox address) of the memory module corresponding to mailbox number 15;

"004" is the classified addressing code. This code represents the stored fourth data of mailbox number 15. The classified addressing code of "000" represents that this function is locked. So the messages are stored in the mailbox address of the wireless receiving device's memory module according to the mailbox number 15 and classified addressing code 004;

"Deposit account of bank A" is the service title. This title represents the name of this mailbox and is entitled by the bank A or user.

"17" is the security code, wherein the binary system of "1" is 0001, the binary system of "7" is 0111, so that the combined number of "17" will be represented by "00010111". Every byte of the transmitted data will be encrypted by using "exclusive or" logic with "00010111" before transmission and restored with the same logic after received.

After the definition, bank A should only encrypt the format [1234567+15+004+deposit account] with security code 17 and send to air. Afterwards, only the wireless receiving device with machine code "1234567" will accept these data, decode and store it into a corresponding mailbox.

In this way, the user can read the information of his (or her) deposit account from the output module when input a demand from the input interface, therefore implement the wireless communication function of the electronic account book.

The second preferred embodiment is described as follows.

Figure 2:
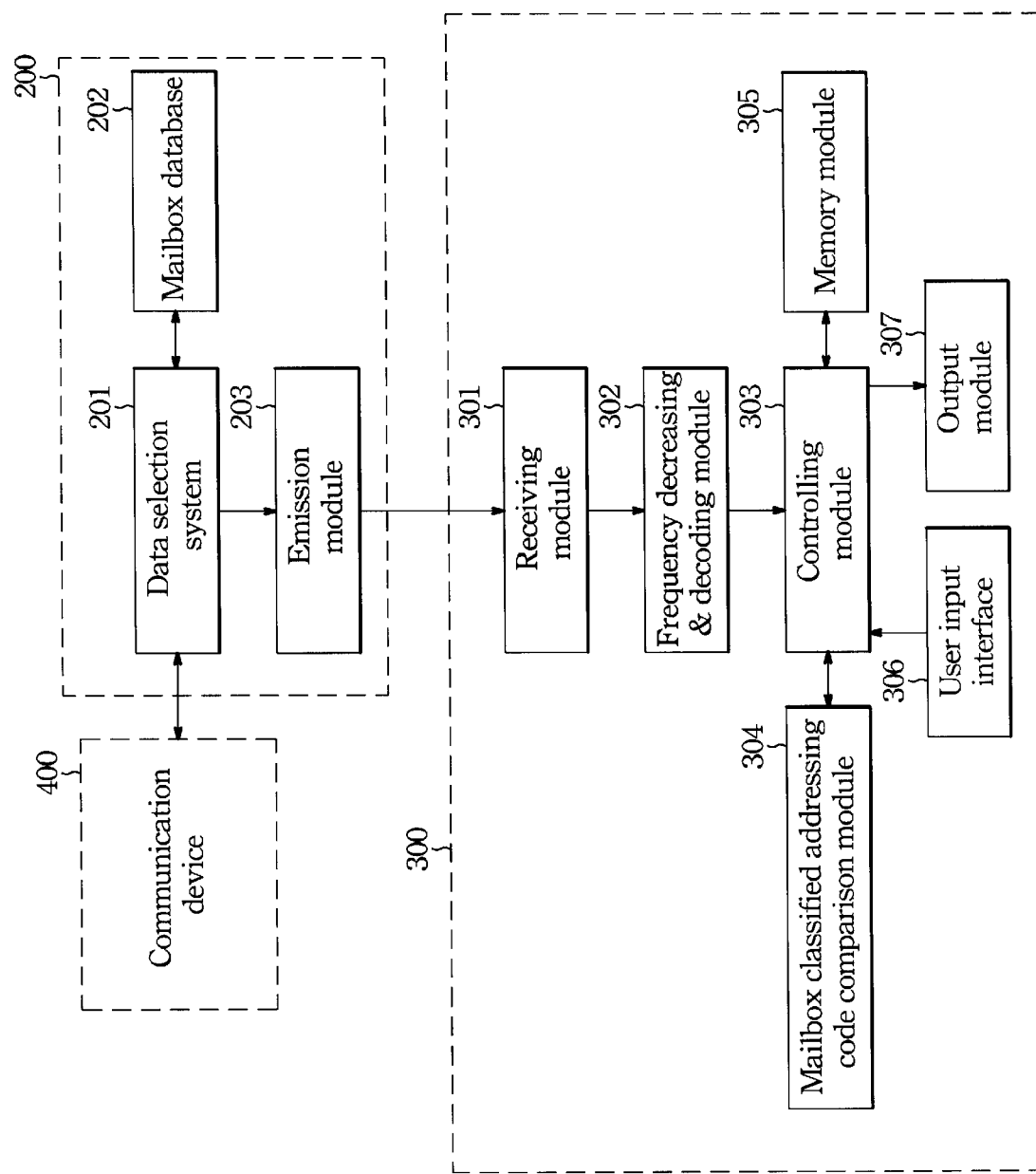
FIG. 2 is a block diagram showing the control system of the wireless electronic account book according to the second preferred embodiment of the present invention.

Referring to FIG. 2, this figure demonstrates the system configuration of the second embodiment. The information transmission dealer 200 in the figure comprises data selection system 201, mailbox database 202, and emission module 203. The data selection system 201 is coupled to communication device 400 in order to receive the external messages. Nevertheless, the information transmission dealer 200 has jurisdiction within certain limits in this embodiment. That is, when the user of wireless receiving device 300 try to exercise one of the functions of the wireless electronic account book, he can ask for the information transmission dealer 200 to provide the function service through the communication device 400.

After the data selection system 201 receives the ID code of the wireless receiving device 300 and the user, the data selection system 201 will compare the data stored in the mailbox database 202 to confirm the legality of the user. When the validity of the user is confirmed, the information transmission dealer 200 will store the ID code of the wireless receiving device 300, the corresponding service code and security code (of specific service title) into the mailbox database 202. Next, the machine code of the wireless receiving device 300 is identified, then the mailbox number and the classified addressing code of specification title are defined, the data format with [mailbox prefix code+mailbox number+classified addressing code+service title+security code] is sent out via the emission module 203, and the mailbox definitions of the wireless receiving device 300 is completed by way of wireless communication. The mailbox prefix code of this format belongs to the machine code of the wireless receiving device 300.

The wireless receiving device 300 comprises a receiving module 301, a frequency decreasing and decoding module 302, a controlling module 303, a mailbox classified addressing code comparison module 304, a memory module 305, a user input interface 306 and an output module 307. The receiving module 301 will receive the wireless signal emitted by the emission module 203, then the coupling frequency decreasing and decoding module 302 will reduce the frequency of this wireless signal and decoding. Afterwards, the controlling module 303 will compare the machine code of decoding data first. Next, the corresponding classified addressing code that is stored in the memory module 305 is removed and is compared with the receiving data by the mailbox classified addressing code comparison module 304. As a result, the mailbox can be defined and the service information can be stored.

Figure 4:
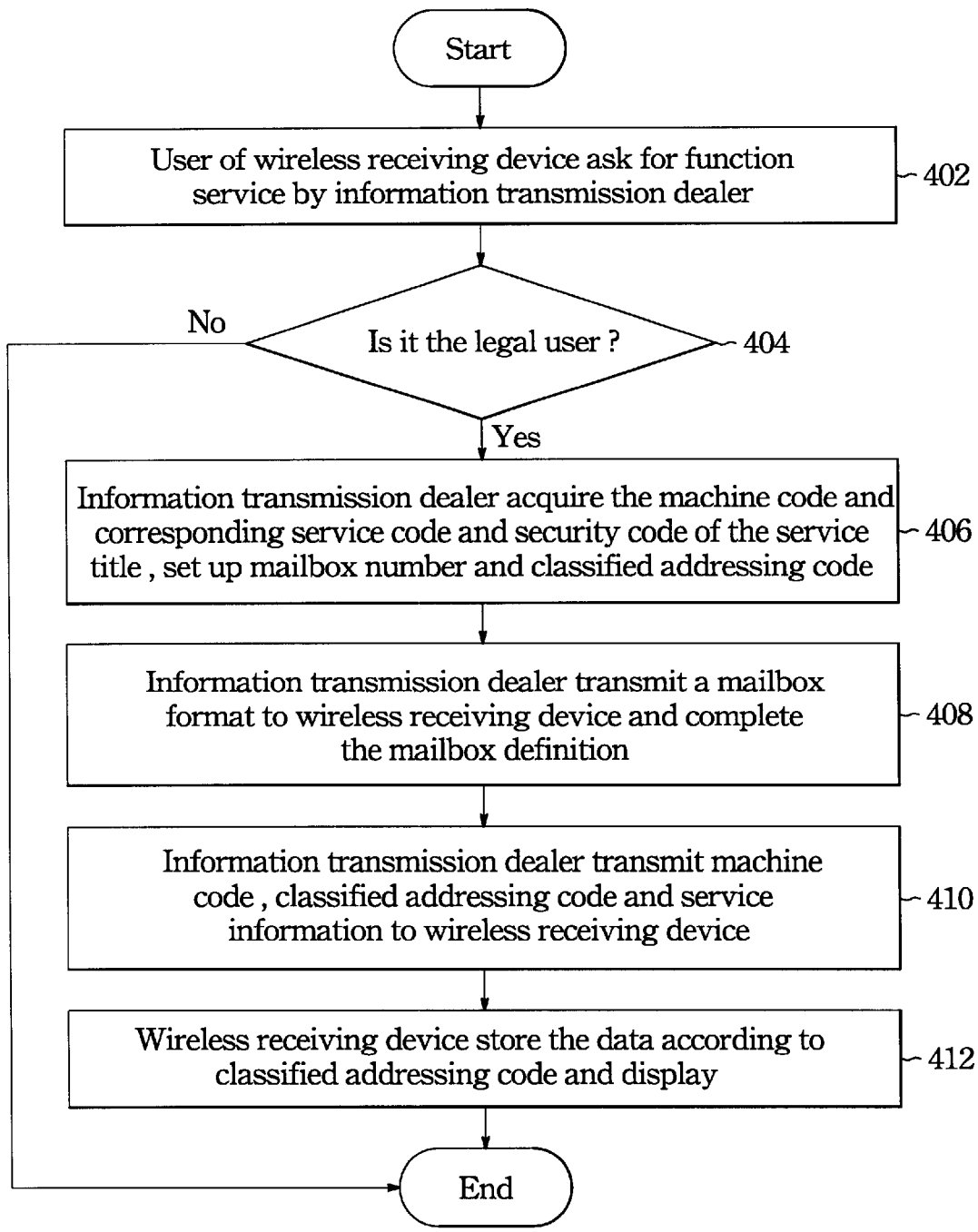
FIG. 4 is a block diagram showing the transmission flow chart of the control system of the wireless electronic account book according to the second preferred embodiment of the present invention.

Referring to FIG. 4, the figure shows the wireless data transmission flow of an electronic account book according to the second embodiment of the present invention. Firstly, the user of wireless receiving device asks the information transmission dealer to provide the function of wireless electronic account book (step 402), and then the user provide user's ID and the ID of the wireless receiving device to the wireless transmission dealer at the same time. Then, the information transmission dealer will check the validity of the user and his limits of authority according to the data stored in its database (step 404). If it is not a legal user, then the flow is ended. Otherwise the information transmission dealer will find out the service title, the corresponding service code and security code of this service function according to the request of the user, and then store all the mentioned information. Moreover, the machine code of the wireless receiving device is acquired, and the corresponding mailbox number and classified addressing code of this service title is define (step 406).

Subsequently, the information transmission dealer transmits the mailbox format [mailbox prefix code+mailbox number+classified addressing code+service title+security code) to the wireless receiving device in order to complete the mailbox definition (step 408). Thereafter, the subsequent service information is transmitted.

In the actual service information transmission of the present invention, the information transmission dealer transmits the machine code of the wireless receiving device, the classified addressing code and service information to the wireless receiving device (step 410). The wireless receiving device stores these data in the corresponding mailbox according to the classified addressing code and display on the output interface from the request of user (step 412).

Hereinbefore, the wireless electronic account book and the controlling system are described according to the first and second preferred embodiments of the present invention. By using this wireless communications, the bank savings, the credit line of credit cards, or other personal financial information will transmit to the personal wireless receiving device. Moreover, although there are limited wireless communication bandwidths, the user can manage different accounts that are provided by variety of information providing dealers (i.e. the banks) in only one wireless receiving device by way of the definition of the data format, or transmit the wireless information directly via the information transmission dealer (i.e. the telecommunication dealer) to achieve the function of the wireless electronic account book.

As is understood by a person skilled in the art, the foregoing preferred embodiments of the present invention are illustrative of the present invention rather than limiting of the present invention. They are intended to cover various modifications and similar arrangements included within the spirit and scope of the appended claims, the scope of which should be accorded the broadest interpretation so as to encompass all such modifications and similar structures.

What is claimed is:

1. A wireless receiving device, said device comprises:
   a receiving module, said receiving module is used to receive wireless transmission signals, which includes a mailbox format or a service information;
   a frequency decreasing & decoding module, said frequency decreasing & decoding module is coupled to said receiving module and is used to reduce frequency of said wireless transmission signal from said receiving module and decode said signal;
   a controlling module, said controlling module is coupled to said frequency decreasing & decoding module to handle the decoded signal from said frequency decreasing & decoding module;
   a memory module, said memory module is coupled to said controlling module and is used to store a machine code of said wireless receiving device, said mailbox format and said service information;
   a comparison module, said comparison module is coupled to said controlling module to compare said wireless transmission signal with said mailbox format which is stored in said memory module, and store back the result to said memory module;
   an input interface, said input interface is coupled to said controlling module to input an instruction; and
   an output module, said output module is coupled to said controlling module to output a message handled by said controlling module.

2. The device of claim 1, wherein said receiving module receives said wireless transmission signal from a wireless system administrator.

3. The device of claim 2, wherein said wireless system administrator further comprises a data selection module, a database and an emission module.

4. The device of claim 3, wherein said data selection module of said wireless system administrator is coupled to a communication device, a user of said wireless receiving device can use said communication device to ask for a function service from said wireless system administrator.

5. The device of claim 1, wherein said controlling module compares said machine code of said wireless receiving device with a message transmitted from said frequency decreasing & decoding module to judge if said message must to be stored.

6. The device of claim 1, wherein said wireless receiving device is selected from the group consists of a personal digital assistant, a handheld computer, a cellular phone, and a pager.

7. A wireless communication system, said system comprises:
   an information providing dealer, said information providing dealer comprises a database to store a user's data, a handling module to judge legality and limit of authority of said user and transfer a service information;
   an information transmission dealer, said information transmission dealer comprises a data selection module, a mailbox database, and an emission module, wherein said data selection module store the data of said user into said mailbox database, and inquire said service information from said information providing dealer, and transmit wireless signals of a mailbox format and a service information via said emission module;
   a wireless receiving device, wherein said wireless receiving device further comprises:
   a receiving module, said receiving module is used to receive said wireless signal from said information transmission dealer, wherein said wireless signal includes said mailbox format and said service information;
   a frequency decreasing and decoding module, said frequency decreasing and decoding module is coupled to said receiving module and is used to reduce frequency of said wireless signals from said receiving module and code said signal;
   a controlling module, said controlling module is coupled to said frequency decreasing and decoding module to handle the decoded signal from said frequency decreasing and decoding module;
   a memory module, said memory module is coupled to said controlling module and is used to store a machine code of said wireless receiving device, said mailbox format and said service information;
   a comparison module, said comparison module is coupled to said controlling module to compare said wireless signals with said mailbox format which is stored in said memory module, and store back the result to said memory module;
   an input interface, said input interface is coupled to said controlling module to input an instruction; and
   an output module, said output module is coupled to said controlling module to output a message handled by said controlling module.

8. The system of claim 7, wherein said information providing dealer and said information transmission dealer are coupled to a communication device respectively.

9. The system of claim 8, wherein said user of said wireless receiving device can ask for a function service from said information providing dealer via said communication device.

10. The system of claim 7, wherein said controlling module compare said machine code of said wireless receiving device with a message transmitted from said frequency decreasing & decoding module to judge if said message must toe be stored.

11. The system of claim 7, wherein said wireless receiving device is selected from the group consists of a personal digital assistant, a handheld computer, a cellular phone, and a pager.

12. The system of claim 7, wherein said information providing dealer includes a financial business such as a bank.

13. A method of wireless communication, said method comprises:

asking for a function service of an information providing dealer from a user of a wireless receiving device, wherein said user provides an identification code of said wireless receiving device and said user to said information providing dealer;

checking legality and limit of authority of said user by said information providing dealer;

acquiring a corresponding service code and a security code of said function service by said information providing dealer, wherein said service code and said security code are stored with said identification code of said wireless receiving device;

defining a corresponding mailbox number and a classified addressing code of said function service and find out a machine code of said wireless receiving device by said information providing dealer;

sending a mailbox format with said machine code of said wireless receiving device, said mailbox number, said classified addressing code, said service function and said security code to said wireless receiving device and complete a mailbox definition;

transmitting said machine code, said classified addressing code and a service information to said wireless receiving device; and storing said service information to a corresponding mailbox of said wireless receiving device according to said classified addressing code.

14. The method of claim 13, wherein said wireless receiving device is selected from the group consists of a personal digital assistant, a handheld computer, a cellular phone, and a pager.

15. The method of claim 13, wherein said identification code of said wireless receiving device comprises a representative number.

16. The method of claim 13, wherein said security code and said service information are encrypted by a exclusive or logic before transmission.

17. The method of claim 13, wherein said mailbox number represents for a specific address of a memory in said wireless receiving device, wherein the size of said mailbox number is related to said memory size.

18. The method of claim 13, wherein said classified addressing code represents for different data stored in said mailbox number.

19. The method of claim 13, wherein said machine code belongs to said specific wireless receiving device in order to distinguish between different devices.

20. The method of claim 13, wherein said sending step to define a mailbox of said wireless receiving device has to do once, said service information can transmit continuously afterwards.

* * * * *